(No Model.)
H. F. SEAVERT.
HORSE COLLAR FASTENER.
No. 447,586. Patented Mar. 3, 1891.
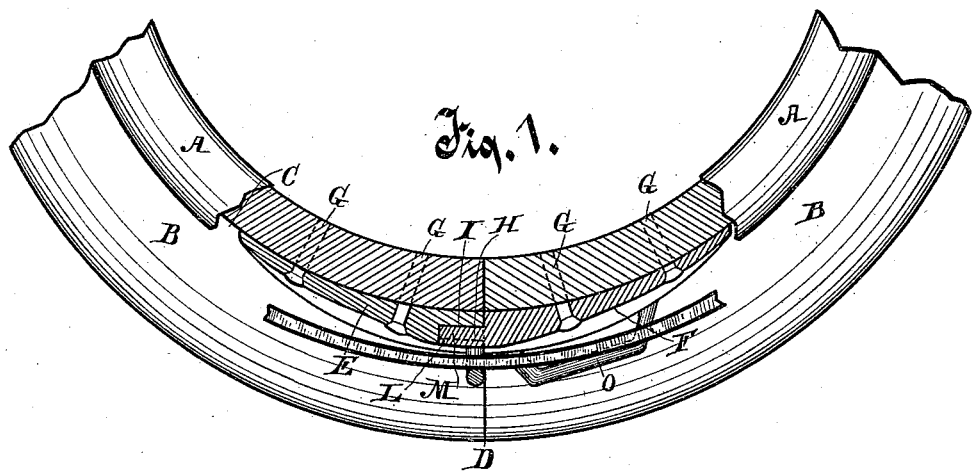
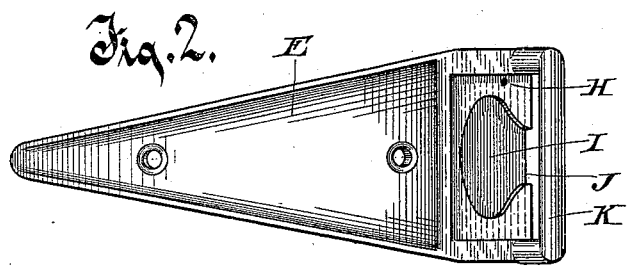
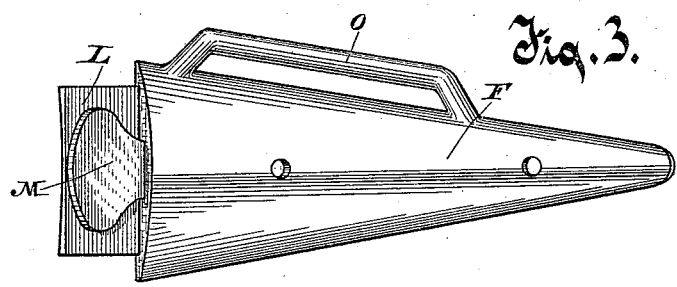
Witnesses.
O. N. Kuney.
Anna V. Faust.
Inventor.
Herman F. Seavert
by Curtis V. Benedict
Attorney.

UNITED STATES PATENT OFFICE.

HERMAN F. SEAVERT, OF FORT ATKINSON, WISCONSIN.

HORSE-COLLAR FASTENER.

SPECIFICATION forming part of Letters Patent No. 447,586, dated March 3, 1891.

Application filed November 22, 1890. Serial No. 372,297. (No model.)

*To all whom it may concern:*

Be it known that I, HERMAN F. SEAVERT, of Fort Atkinson, in the county of Jefferson and State of Wisconsin, have invented a new and useful Improvement in Horse-Collar Fasteners, of which the following is a description, reference being had to the accompanying drawings, which are a part of this specification.

My invention relates to a horse-collar fastener such as is adapted for securing the ends of a horse-collar together at its lowest part; and the particular object of the invention is to provide a device that can be readily and permanently secured to the collar; that will furnish a large and yet compact bearing of the two parts on each other; that will be very close and flat in the groove of the collar, and that yet will secure the two ends of the collar very firmly together against any endwise movement and strongly against lateral strain.

In the drawings, Figure 1 represents the fragmentary lower ends of a horse-collar with my improved fastening connected thereto, and a portion of the hame-strap inserted therein for locking it in position, parts being broken away and shown in section for better illustration. Figs. 2 and 3 are the disassembled parts of my collar-fastener, shown in perspective, as seen from the under or outer side.

My device is adapted to be used with a collar having an outer or front roll A and an inner or rear roll B, between which a groove C is formed, in which groove the two parts of my fastener are secured, so as to abut each other at the line of junction D of the two parts of the collar.

The fastener is constructed of metal in two parts E and F, which are each secured to its respective part of the collar conveniently by rivets G.

The parts E and F of my fastener are so formed on their inner or upper surface as to fit perfectly into the groove C of the collar, and are comparatively thin, not extending a great distance in vertical thickness. The part E is provided in its under surface at its inner end with a double recess H and I, the first or outer recess H being substantially rectilinear in form and nearly as large in lateral extent as the lateral dimensions of the fastening itself, while the inner recess I is formed with a laterally narrow neck J at the inner end of the part E and an enlarged or widened inner portion, the entire recess I being considerably less in lateral extent than the recess H. Neither the recess H nor the recess I passes entirely through the part E; but both are backed and covered by inner portions of the part E. This part E is also provided with a loop L, projecting therefrom at its inner end, which loop extends across the recess H at a little distance from the plane of the outer surface of the part E.

The part F of the fastener is provided with a tongue projecting from its end formed in two integral flat-plate sections, the outer or larger of which sections L is of such size and form as to fit the recess H in the part E, while the smaller and inner section M is of such form and size as to fit the inner recess I. The section L is rectilinear in form and of considerably larger extent laterally than the section M, which is curved in form and of less extent than the section L, and has a narrow or neck portion adapted to be received into the neck J of the recess I. When this tongue on the part F is placed upon and fitted into the recesses H and I of the part E, the two parts are firmly secured together against lateral or endwise movement, and the hame-strap N is inserted through the loop K and bears against the part F, locking the two parts E and F permanently in place in connection with each other. It will be noted that this construction forms a very flat and compact connection, and that the two parts are held together by a considerable extent of bearing against endwise or cross strain by reason of the peculiar conformation and extent of the two sections of the tongue on the part F and of the recesses therefor in the part E, and that the flat, wide, and long outer surface of the section L of the tongue is an extensive bearing for the hame-strap. A martingale-loop O is provided on the lower edge of the part F.

What I claim as new, and desire to secure by Letters Patent, is—

The horse-collar fastener consisting of the two parts E and F, formed for and adapted to be secured in the groove in the two parts of a horse-collar, the ends of the parts being arranged to abut against each other, one part having a tongue formed in two integral flat sections, an outer enlarged section L and an inner smaller section M, having a neck near its junction with the main part F, and an enlarged portion at a distance therefrom, the entire section M being smaller in lateral dimensions than the section L and being adapted to serve as a key covered by the larger section L, the part E having a double recess adapted to receive therein the sections L and M of the tongue of the other part, and a single loop K, formed on the part E at its extremity opposite the recess H, for receiving the hame-strap therein and holding it against the flat extended surface of the tongue, substantially as described.

In testimony whereof I affix my signature in presence of two witnesses.

HERMAN F. SEAVERT.

Witnesses:
L. B. CASWELL, Jr.,
L. B. CASWELL.